US005564209A

United States Patent [19]
Zagnoli

[11] Patent Number: 5,564,209
[45] Date of Patent: Oct. 15, 1996

[54] APPARATUS FOR POSITIONING AROUND THE SCREEN OF A CATHODE RAY TUBE

[76] Inventor: Lucinda J. Zagnoli, 201 W. Laurel St., No. 508, Tampa, Fla. 33602

[21] Appl. No.: 357,730

[22] Filed: Dec. 16, 1994

[51] Int. Cl.⁶ ............................. G09F 7/12; A47B 97/00
[52] U.S. Cl. ................. 40/594; 40/630; 40/640; 446/73; 446/268; 312/7.2; 273/148 B; 248/918
[58] Field of Search ............................. 40/638, 152, 630, 40/594, 620, 312, 633, 640; 248/918, 205.2; 21/89; 446/901, 268, 72, 73; 434/81; 312/7.2; 273/148 B

[56] References Cited

U.S. PATENT DOCUMENTS

| | | | |
|---|---|---|---|
| 685,695 | 10/1901 | Seymoure | 40/152 |
| 1,397,079 | 11/1921 | Cohen | 40/665 |
| 2,192,423 | 3/1940 | Ward et al. | 40/312 X |
| 2,736,115 | 2/1956 | James | 40/312 |
| 3,214,852 | 11/1965 | Ford et al. | 40/640 |
| 3,678,705 | 7/1972 | Korwin | 40/152 X |
| 4,472,895 | 9/1984 | Cillario | 40/312 |
| 4,540,378 | 9/1985 | Cusimano | 446/369 |
| 4,869,565 | 9/1989 | Bachman | 248/918 X |
| 4,950,196 | 8/1990 | Fortune et al. | 446/73 |
| 5,072,998 | 12/1991 | Oh | 248/205.2 X |
| 5,104,087 | 4/1992 | Wentzloff et al. | 248/918 X |
| 5,125,612 | 6/1992 | McNeal | 248/918 X |
| 5,292,099 | 3/1994 | Isham et al. | 248/918 X |
| 5,398,905 | 3/1995 | Hinson | 248/442.2 |
| 5,464,214 | 11/1995 | Griffin | 312/7.2 X |

*Primary Examiner*—Peter M. Cuomo
*Assistant Examiner*—James O. Hansen
*Attorney, Agent, or Firm*—Dominik & Stein

[57] ABSTRACT

An apparatus for positioning around the screen of a cathode ray tube comprising, a strap of a flexible material with a circumference that allows it to be positioned around the upper surface, lower surface and side surfaces of a cathode ray tube. The strap is adjacent the screen end of the cathode ray tube. The strap assumes a generally rectangular configuration when placed around the screen. The strap, when positioned around the cathode ray tube, forms two vertical side extents, a horizontal upper extent and a lower horizontal extent. A pile-type fastener is secured to a central region of the upper extent of the strap. An adjustable structure is in the lower extent of the strap diametrically opposed from the flap. A replaceable decorative ATTACHMENT is attached and supported by the strap and pile-type fastener.

18 Claims, 10 Drawing Sheets

APPARATUS FOR POSITIONING AROUND THE SCREEN OF A CATHODE RAY TUBE

BACKGROUND OF THE INVENTION

1. Field of the Invention

This invention relates to a decorative apparatus for positioning around the screen of a cathode ray tube and, more particularly, to position around the screen of the cathode ray tube, a strap which will accommodate decorative members secured to the strap with the decorative members extending outwardly from the strap.

2. Description of the Background Art

Presently, it is well known that many adults and children perceive computers as complex and intimidating. Making the computer appear friendlier would remove the fear and hostility many children and adults have toward computers.

Generally children have short attention spans and only become seriously motivated to engage in activities that excite their imagination. Parents today are seeking ways to provide their children with the skills that will benefit them later in life. Parent's often desire to motivate their children to acquire these skills at a very young age. Children do not understand that they are developing skills, but rather see only the impersonal apparatus with which they must associate. This is particularly true with younger children.

Stuffed toys are well known in the prior art for use as playthings by children and adults. They are designed to appeal to children and adults, and thereby encourage their use as playthings. They are not designed to encourage the use of other objects. There have been few attempts to use the prior art with computers to reduce the fear associated with their use.

As evidenced by the small number of prior art patents for such use, efforts are continuing to improve the use of stuffed toys. Consider, for example, U.S. Pat. No. 3,867,971 to Isaac Hazen relating to combination handbag and toy, container and figurine, or the like; U.S. Pat. No. 4,540,378 to Sharon Cusimano relating to a stuffed figure having positionable arms; U.S. Pat. No. 4,756,580 to Charles Middleton, Jr. relating to adjustable video monitor cabinet; U.S. Pat. No. 4,950,196 to Frederick Fortune and Timothy Bumb relating to a hand basket with attached toy; U.S. Pat. No. 5,006,089 to James Lee relating to life-like toy animal; and U.S. Pat. No. 5,072,998 to Bobby Y. Oh relating to stuffed anatomical members.

The Oh patent uses plush stuffed anatomical members for mounting on a cathode ray tube computer monitor or a like object to make the object less intimidating to children and therefore to encourage its use by children. The stuffed anatomical members may include a head member, two arm members, and two feet members. Each member is detachably secured to the object using hook and loop fasteners.

The Oh device has a practical deficiency. This deficiency involves the method of attaching the objects to the monitor. The Oh device requires that a plurality of hook and loop fastener mating surfaces be attached to the surface of the monitor. These fasteners must be permanently attached. The user is unable to remove the fasteners with out some damage to the surface of the monitor. Removal of the fasteners leaves the user with an unpleasant looking monitor surface.

As will become evident, nothing in the prior art provides the benefits and advantages attendant with the present invention.

Accordingly, it is an object of this invention to provide an improvement which overcomes the aforementioned inadequacies of the prior art devices and provides an improvement which is a significant contribution to the advancement of the art.

Another object of this invention is to provide a new and improved apparatus for positioning around the screen of a cathode ray tube comprising, a cylindrical strap of a flexible material having a circumference to be positioned around the upper surface, lower surface and side surfaces of a cathode ray tube. The strap is adjacent the screen end of the cathode ray tube. The strap has a horizontal axis that extends through the center of the screen of the cathode ray tube. The strap assumes a generally rectangular configuration when placed around the screen. A flap extends downward a short distance from the upper edge of the upper extent of the strap. A pile-type fastener is secured to the central extent of the flap in a vertical orientation. A pocket is attached to at least one vertical extent of the strap on the side adjacent the screen of the cathode ray tube. An adjustable structure is in a diametrically opposed position from the flap in the lower extent of the strap. The strap having placed on to it a replaceable decorative means supportable by the pocket and the pile-type fastener of the flap of the strap.

Another object of this invention is to facilitate the positioning and adjustment of the decorative structures onto the cathode ray tube.

Another object of this invention is to position a friendship inducing structure around the screen of a cathode ray tube that promotes usage and allows the user to remove the apparatus without permanent damage.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an apparatus for positioning around the screen of a cathode ray tube. The apparatus is a strap of flexible material. The strap's circumference allows it to be positioned around the upper surface, lower surface and side surfaces of a cathode ray tube adjacent its screen end to form a cylinder with a rectangular cross section. The generally horizontal axis of the strap extends through the center of the screen of the cathode ray tube. The strap assumes a generally rectangular configuration when placed around the screen with a flap extending downwardly a short distance from the upper horizontal upper extent of the strap. The strap forms two vertical side extents, a horizontal upper extent and a lower horizontal extent when position on the cathode ray tube. A pile-type fastener is secured to the central region of the flap in a vertical orientation. The pile-type fastener faces away from the screen. A plurality of pockets are attached to the vertical extents of the strap on the sides adjacent to the cathode ray tube. A stitched seam permanently attaches the pockets to the vertical extents. The seam is sewn along vertical end edges and the lower horizontal end edge of the pocket forming a U-shaped seam. Each pocket has an opening along its upper horizontal end edge. There is an adjustable structure in a lower extent of the strap that is diametrically opposed from the flap. The adjustable structure is made of an elastomeric structure. The elastomeric structure can resiliently expanded the circumference of the strap. A replaceable decorative attachment is supported by the strap, the pocket and a pile-type fastener. The decorative attachment is a doll. The doll has a first vertical portion, a second vertical portion and a horizontal portion. The first and second vertical portions have rods. The rods are coupled at their upper extents to an adjacent section on the exterior surface of the attachment. The rods have a length and width that is essentially equal to the lengths and widths of the pockets. The rods are positioned in the pockets of the strap. The first vertical portion and second vertical portion are formed in the shape of legs. The horizontal portion is positioned on the upper extent of the strap. The horizontal portion has a rectangular extension to be positioned over the flap of the strap. The extension has an interior side and an exterior side. The interior side has a pile-type fastener assembly that allows it to be affixed to the pile-type fastener of the strap. The exterior side has indicia. The doll has a head and a face. The head extends upwardly from the horizontal portion and is of such strength that it remains in an upright position from the upper horizontal extent of the strap and the upper surface of the cathode ray tube. The face of the doll is positioned in the same direction as the screen of the cathode ray tube.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several Figures.

DETAILED DESCRIPTION OF THE PREFERRED EMBODIMENT

Figure 1:
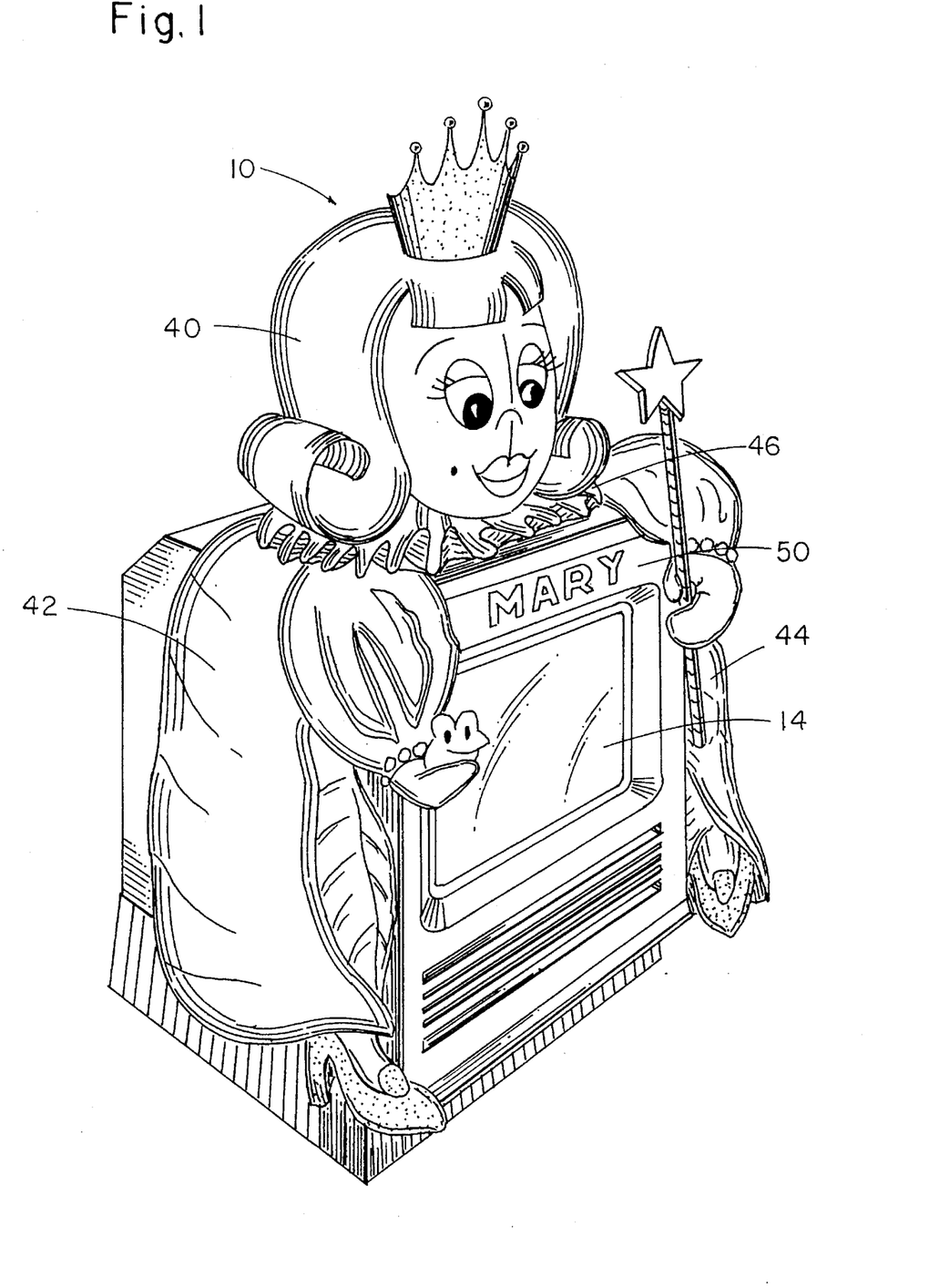
FIG. 1 is a perspective showing of the preferred embodiment of the decorative apparatus for positioning around the screen of a cathode ray tube constructed in accordance with the principles of the present invention.

With reference now to the drawings, and in particular to FIG. 1 thereof, an apparatus for positioning around the screen of a cathode ray tube embodying the principles and concepts of the present invention and generally designated by the reference numeral 10 will be described.

The present invention, the apparatus for positioning around the screen of a cathode ray tube, is made up of three major components, a strap, an adjustable structure and replaceable decorative attachments. Such components are individually configured and correlated with respect to each other so as to attain the desired objective.

Figure 2:
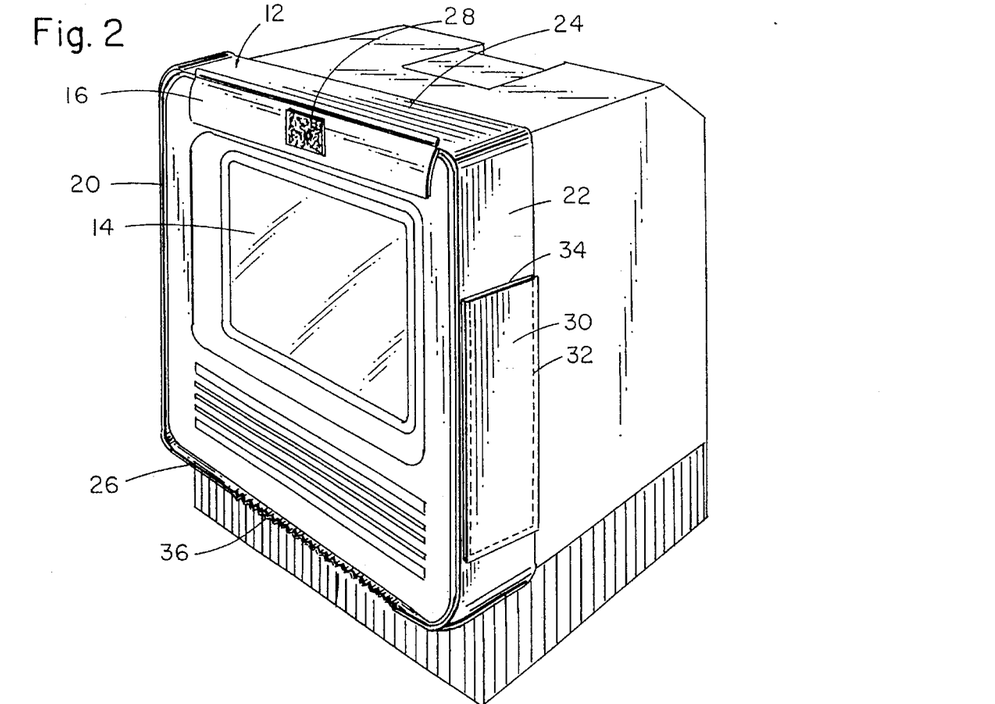
FIG. 2 is a right side view of the preferred embodiment of the strap around the screen of the cathode ray tube.
Figure 3:
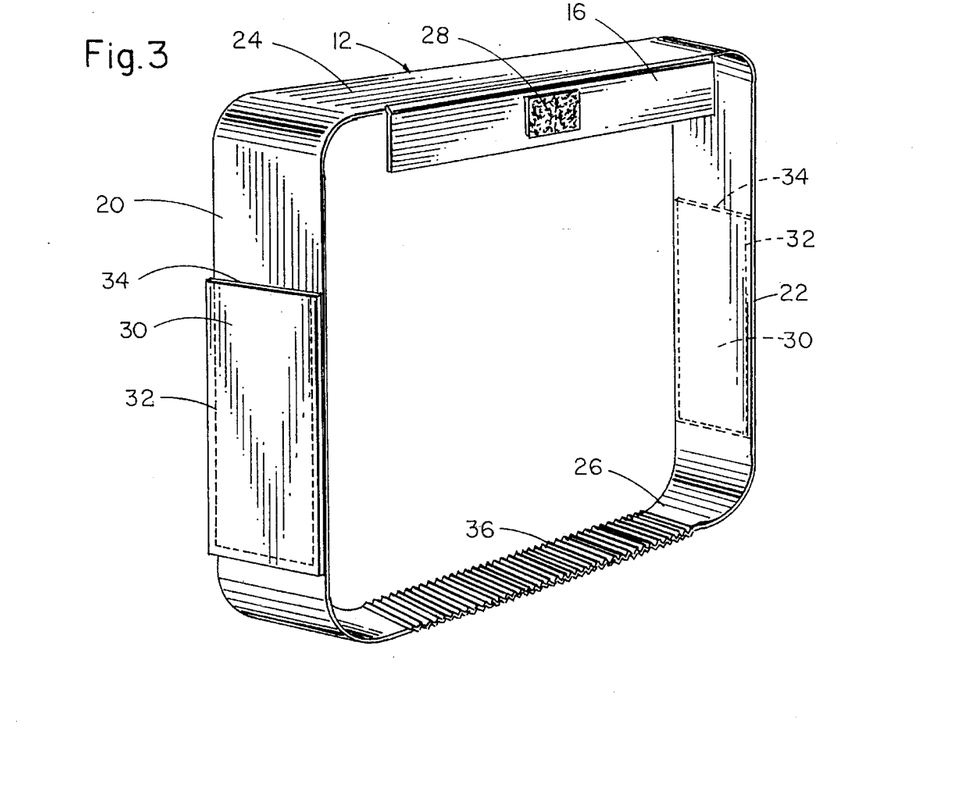
FIG. 3 is a left side view of the preferred embodiment of the strap.

More specifically, referring to FIG. 2 the strap 12 is made of a flexible material having a circumference to be positioned around the upper surface, lower surface and side surfaces of a cathode ray tube 14. The strap 12 is adjacent the screen end of the cathode ray tube and forms a cylinder with a rectangular cross section. The strap has a generally horizontal axis extending through the center of the screen of the cathode ray tube. The strap assumes a generally rectangular configuration when placed around the screen and has a flap 16 extending downward a short distance from the upper horizontal upper extent 24 of the strap. The strap, when positioned around the cathode ray tube, forms a first vertical side extent 20 and a second vertical side extent 22, a horizontal upper extent 24 and a lower horizontal extent 26. FIG. 3 showing the embodiment of the strap 12 as shown in FIG. 2 but, without the cathode ray tube. The preferred embodiment of the strap is a tightly woven inextensible durable fabric. The fabric should be a breathable fabric. Use of an air permeable fabric will prevent moisture build up in the area of contact between the strap and the cathode ray tube.

As shown in FIGS. 2 and 3, a pile-type fastener 28 is secured to the central region of the flap 16 in a vertical orientation facing away from the screen. The flap is formed as part of the strap and made of the same fabric.

There are a plurality of pockets 30 attached to the vertical extents of the strap on the sides adjacent to the cathode ray tube. FIG. 2 shows a pocket on a second vertical extent 22 and FIG. 3 shows a pocket on a first vertical extent 20. A stitched seam 32 is used to permanently attach the pockets 30 to the strap. The stitched seam 32 is sewn along vertical end edges and a lower horizontal end edge of the pockets to form a U-shaped seam. The pockets have an opening along their upper horizontal end edge. Preferably the pockets are made of the same tightly woven fabric used in the strap to preclude stretching. This would be most cost effective. The pockets may, however, be made of other inextensible and durable material.

To secure the strap to the cathode ray tube an adjustable structure is located in the lower extent 26 of the strap 12 and diametrically opposed from the flap as shown in FIGS. 2 and 3. The adjustable structure is made of an elastomeric structure 36. The elastomeric structure 36 is capable of resiliently expanding the circumference of the strap. The elastomeric structure is about one fourth of the length of the strap. The length of the elastomeric structure enables the strap to be positioned around a variety of cathode ray tubes of varied sizes. The elastomeric structure 36 is preferably a material that is combined with any vulcanized rubber.

Figure 4:
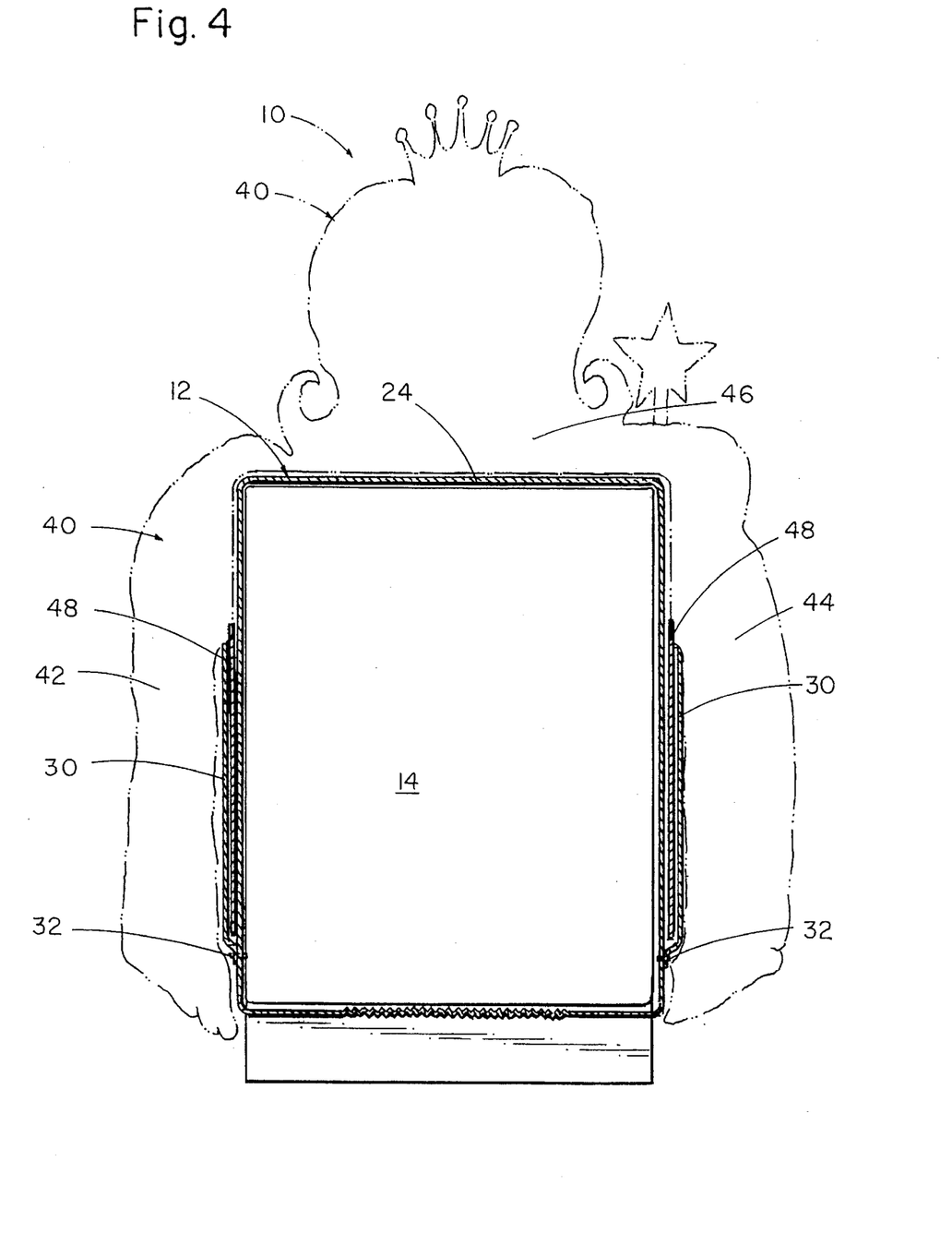
FIG. 4 is a cross sectional view of the front of the structure as shown FIG. 1.
Figure 5:
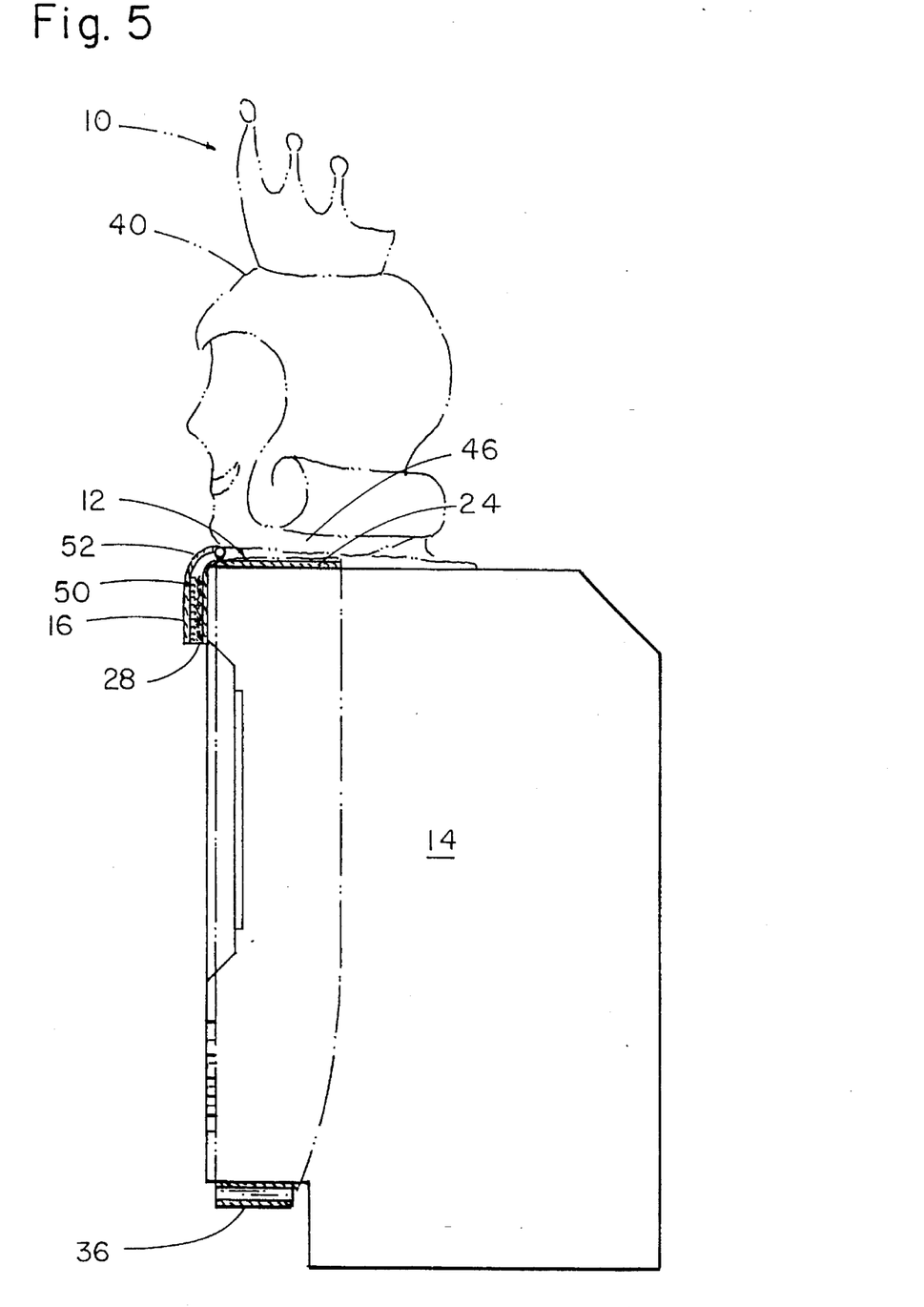
FIG. 5 is a cross section side view of the structure as shown in FIG. 1.

Attached to the strap is a replaceable decorative attachment as shown in FIG. 1. The attachment is supportable by the strap 12, the pockets 30 and a pile-type fastener 28 as shown in FIGS. 4 and 5. The decorative attachment is a doll 40. The doll has a first vertical portion 42, a second vertical portion 44 and an upper horizontal portion 46. The first and second vertical portions have rods 48. The rods are coupled at their upper extents to an adjacent section on the exterior surface of the ornamentation to hold the ornamentation in their proper place. The rods have a length and width that is essentially equal to the lengths and widths of the pockets 30. The rods as shown in FIG. 4 are positioned in the pockets of the strap. The first vertical portion 42 and second vertical portion 44 are formed in the shape of legs.

The horizontal portion 46 of the doll is positioned on the horizontal upper extent 24 of the strap. The horizontal portion 46 of the doll has a rectangular extension 50 that is for positioning over the flap 16 of the strap. The extension 50 has an interior side and an exterior side. The interior side has a pile-type fastener assembly 52 for affixing to the pile-type fastener 28 of the strap. The exterior side has indicia shown in this embodiment as the users name, "MARY". The doll has a head and a face as shown in FIG. 1. The head extends upwardly from the horizontal portion and is able to remain in an upright position from the horizontal upper extent of the strap and the upper surface of the cathode ray tube. The doll's face is positioned in the same direction as the screen of the cathode ray tube.

Figure 6:
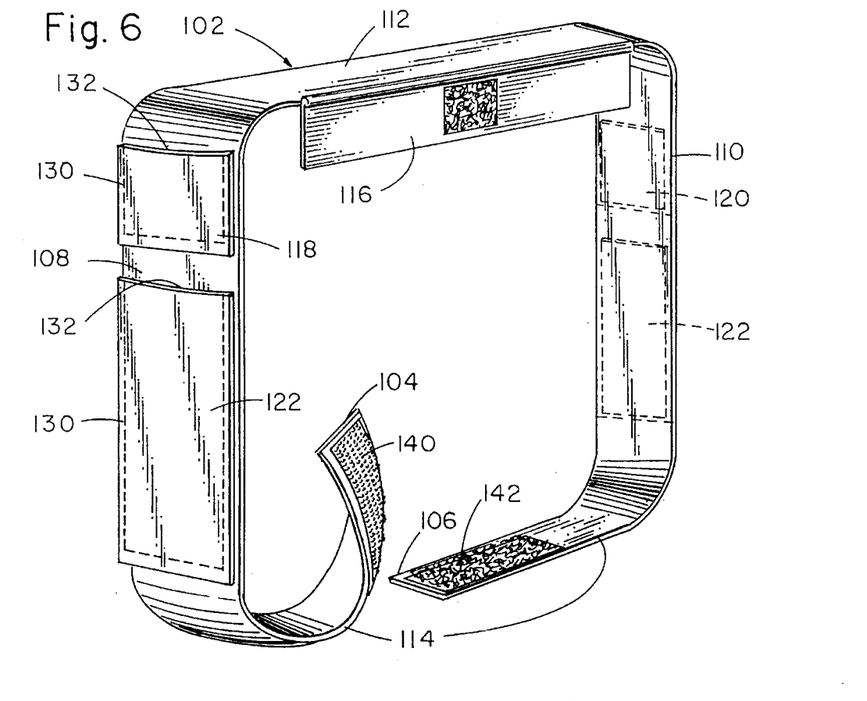
FIG. 6 is a left side view of an alternative embodiment of the strap showing upper and lower pockets on the vertical extent.

FIG. 6 shows another embodiment of the strap 102 where the strap is discontinuous and has a first end edge 104 and a second end edge 106 formed at the lower horizontal extent 114. In the embodiment of FIG. 6 the strap has a first vertical extent 108, a second vertical extent 110, a horizontal upper extent 112 and a lower horizontal extent 114 as in prior structure. A flap extends downward a short distance from the horizontal upper extent 112 of the strap as shown in FIG. 6 and as in the prior structure.

Additionally, FIG. 6 shows there are upper and lower pockets attached to the vertical extents of the strap. The first upper 118 pocket is attached to the first vertical extent 108 and located just below the end of the horizontal upper extent. The second upper pocket 120 is attached to the second vertical extent 110 and located just below the edge of the horizontal upper extent. The first lower pocket 122 is attached to the first vertical extent just above the end of the lower horizontal upper extent. The second lower pocket 124 is attached to second vertical extent 110 just above the end of the lower horizontal upper extent. The first and second upper pockets are about ½ the depth of the first and second lower pocket. A stitched seam 130 is sewn along the vertical end edges and the horizontal end edges of the both upper and lower pockets similar to the stitched seam of FIGS. 2 and 3.

Figure 7:
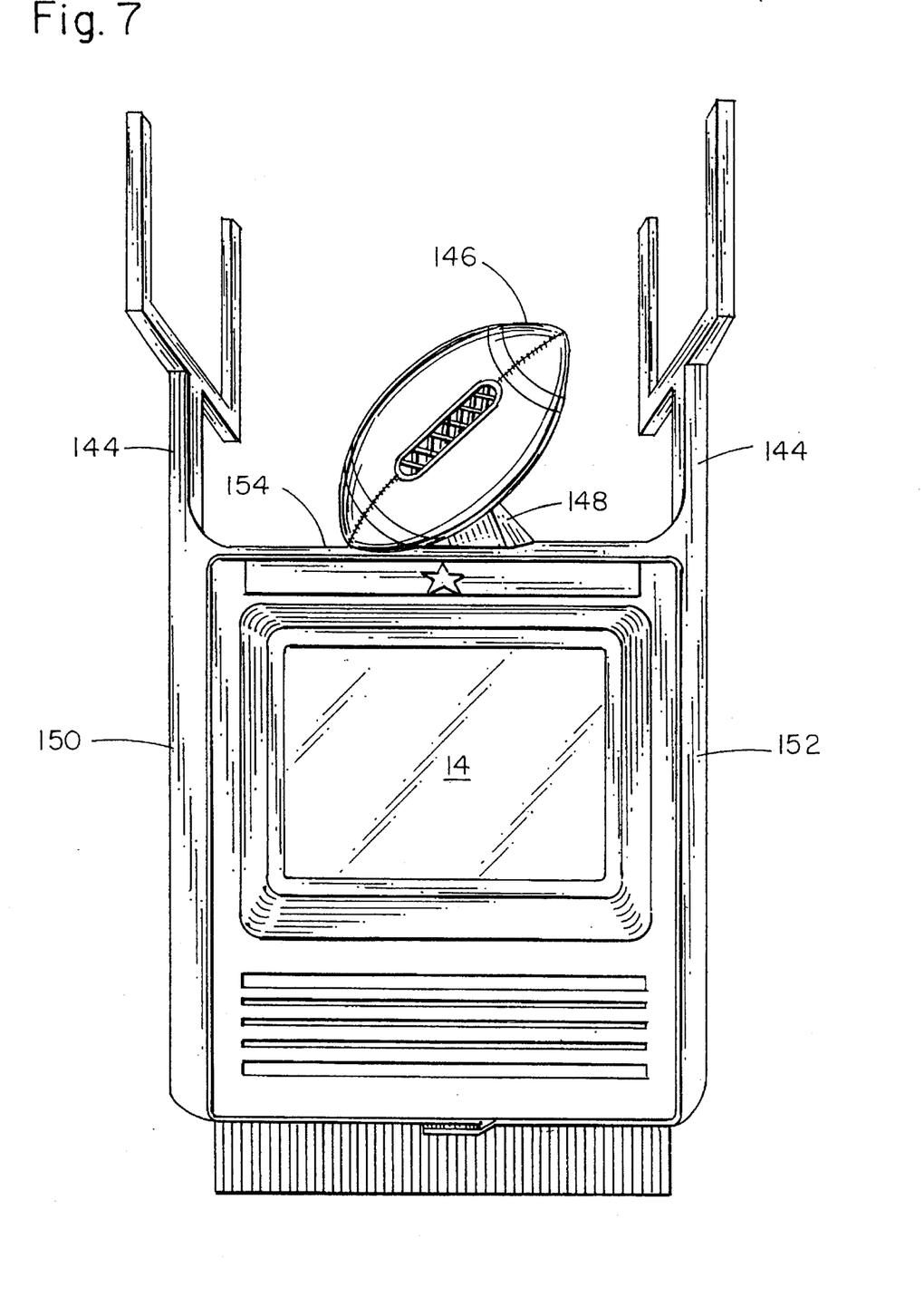
FIG. 7 is a perspective view of an alternative embodiment for the decorative apparatus showing an athletic scene around the screen of the cathode ray tube.

This embodiment in FIG. 6 requires that the adjustable structure have a first part 140 and a second part 142. The first part is positioned on the exterior side of the first end edge 104 and the second part is positioned on the interior side of the second end edge 106. The first part and the second part are releasably coupled when the exterior side of the first end edge overlaps the interior side of the second end edge as shown in FIG. 7.

Attached to the strap of FIG. 6 is another embodiment for the adjustable structure. The adjustable structure of FIG. 6 is a hook and loop type of fastener 140 and 142. The hook and loop type of fasteners are located on the lower extent of the strap. The fasteners are positioned on opposite ends of the straps end edges and form the first and second part of the adjustable structure. The fasteners are sewn or glued to the end edges of the strap.

Figure 8:
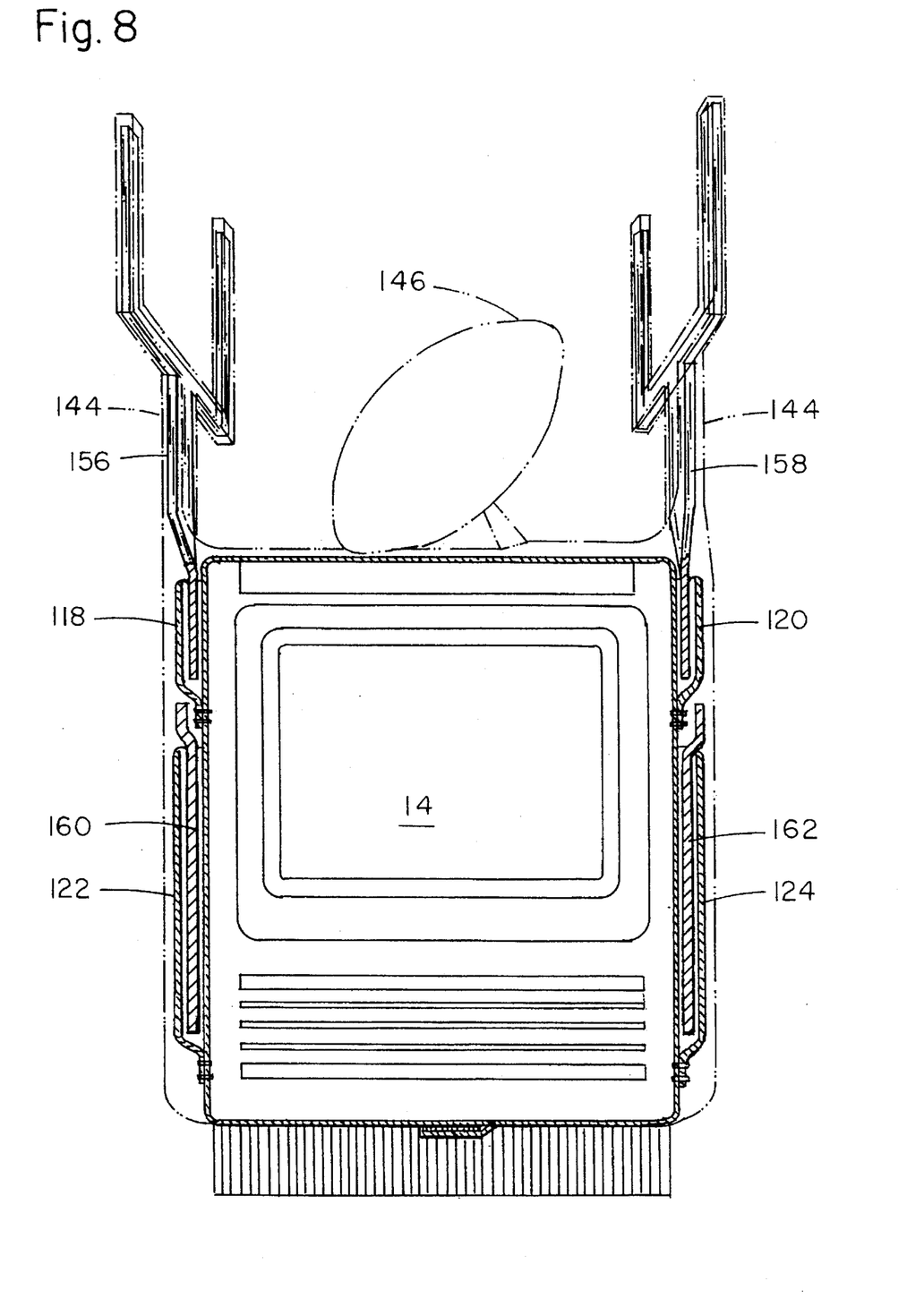
FIG. 8 is a frontal cross sectional view of the structure as shown in FIG. 7.
Figure 9:
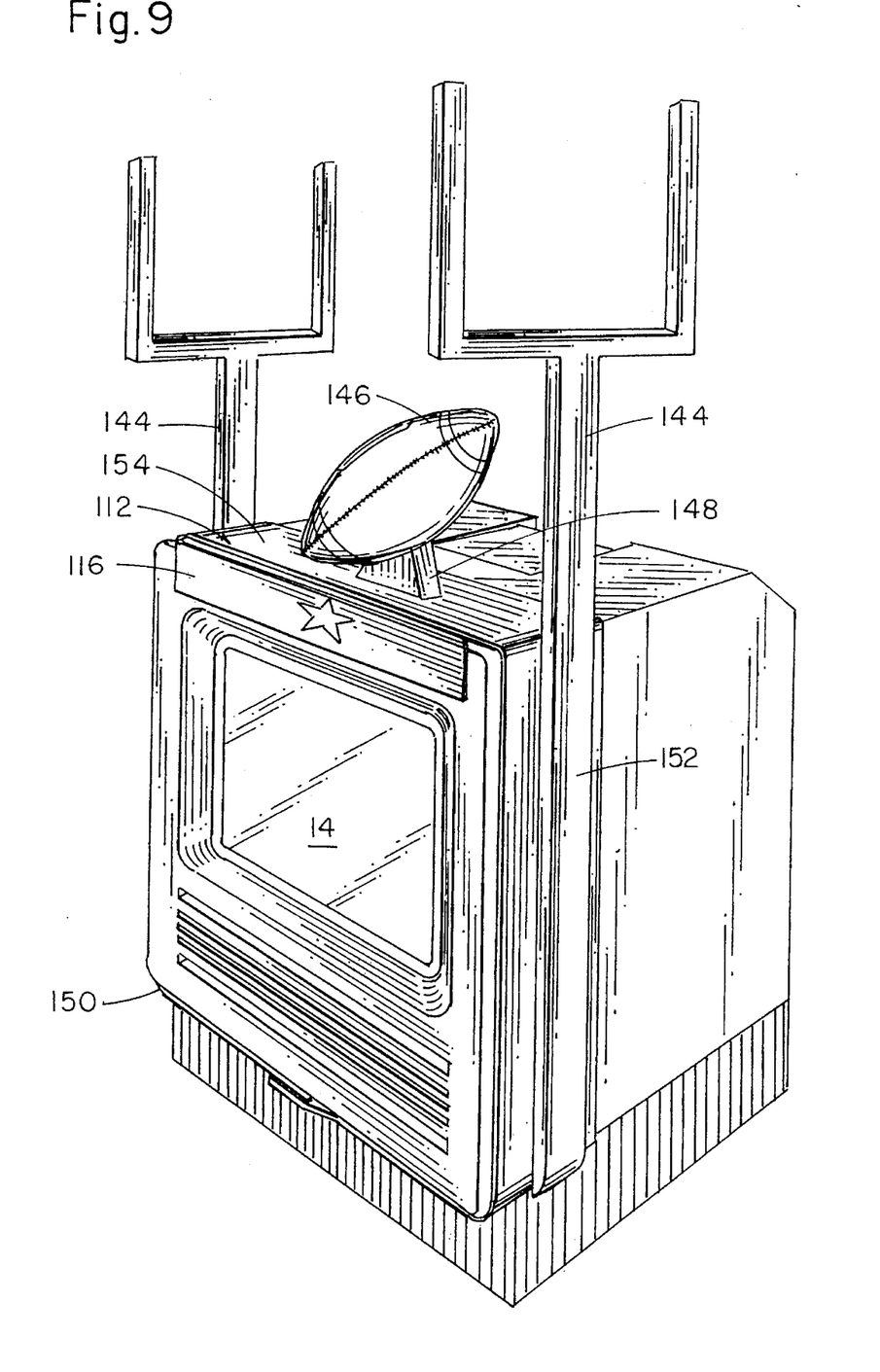
FIG. 9 is a right side view an alternative embodiment of FIG. 7 showing indicia.

A further feature of this embodiment of the replaceable decorative attachment in an ornamentation fashioned like an athletic activity. In FIG. 7 the ornamentation is a pair of football goal posts 144, a football 146 and a kicking tee 148. The ornamentation has a first vertical portion 150, a second vertical portion 152 and a horizontal portion 154. The first and second vertical portions have formed thereon goal post as shown in FIG. 9. FIG. 8 shows the goal post having a rigid first bifurcated rod 156 extending upward from the first upper pocket 118 and a rigid second bifurcated rod 158 extending upward from the second upper pocket 120. The bifurcated rods 156 and 158 have a length essentially equal to the lengths of the upper pockets of the strap and the goal post for placement in the upper pockets. Also, FIG. 8 shows a rigid first rod 160 extending downward into the first lower pocket 122 and a second lower rod 162 extending downward into the second lower pocket 124. The rods 160 and 162 have a length and width essentially equal to the lower pockets for positioning in the lower pockets. The bifurcated rods 156 and 158 with their bifurcations extending upwardly stabilize the tops of the goal post and prevent them from buckling or tipping over. The rods have a lengths and widths essentially equal to the lengths and widths of the lower pockets for positioning in the lower pockets. The rods 160 and 162 are coupled at their upper extent to an adjacent section of the exterior of the ornamentation for proper positioning.

FIG. 9 shows the horizontal portion positioned along the horizontal upper extent 112 of the strap with an extension hanging over the flap 116. Attached to the horizontal portion 154 is a football 146 positioned in a kicking tee 148 as shown. The extension has an interior side and an exterior side. The interior side with a pile-type fastener assembly for affixing to the pile-type fastener of the strap as shown in the previous structure of FIG. 5. The exterior side has indicia in the form of a star, a symbol of a football team represented by the ornamentation.

Figure 10:
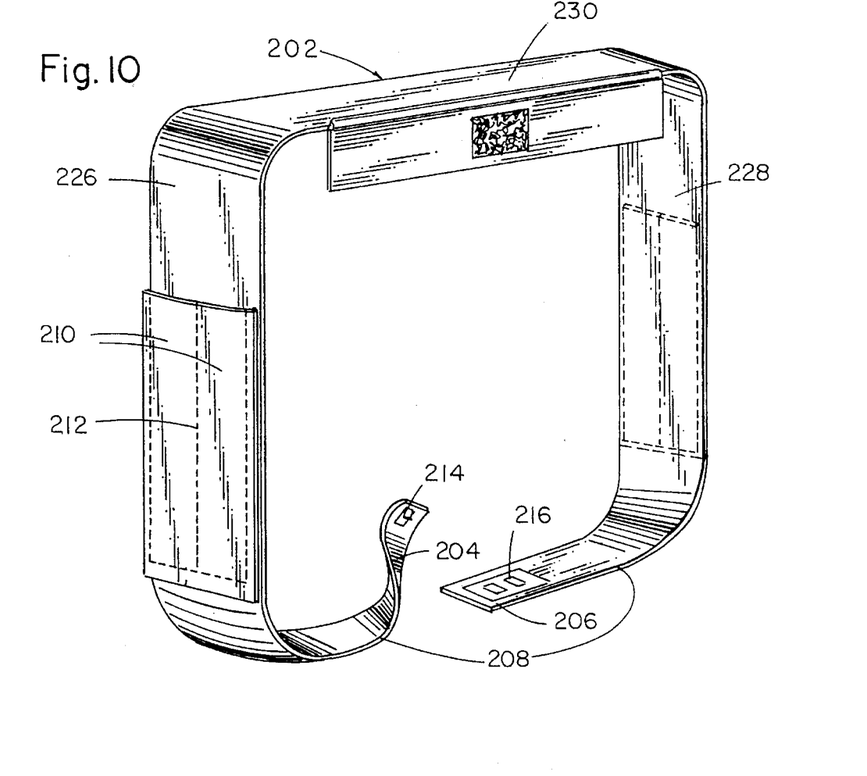
FIG. 10 is a left side view of another alternative embodiment of the strap showing a pocket with two compartments.

FIG. 10 shows yet another embodiment where the strap 202 having vertical extents and horizontal extents as shown in the prior structure of FIG. 6 is discontinuous. The strap has a first end edge 204 and a second end edge 206 at the horizontal extent 208. The pockets on this embodiment are have the same placement as the pockets in FIGS. 2 and 3. The pockets of FIG. 10 have two compartments 210 forming a double pocket. In addition to the stitched seam of FIGS. 2 and 3 in the prior structures there is an additional stitched seam 212 shown in FIG. 10. The additional seam is equal distance from the vertical ends of the pocket and connected to the horizontal seam along the lower horizontal end edge of the pocket. Additionally, as in FIG. 6 the embodiment requires the adjustable structure to have a first part 214 and a second part 216. The first part is positioned on the exterior side of the first end edge and the second part is positioned on the interior side of the second end edge. The first part and the second part are releasably coupled when the exterior side of the first end edge overlaps the interior side of the second end edge as shown in FIG. 10.

Attached to the strap of FIG. 10 is a further embodiment for the adjustable structure. In this embodiment the adjustable structure is a clasp. The clasp is located in the lower extent of the strap. Arranged on opposite end edges of the strap. The catch 214 of the clasp is located on the exterior side of the first end edge and the holder 216 is located on the interior side of the second end edge.

Figure 11:
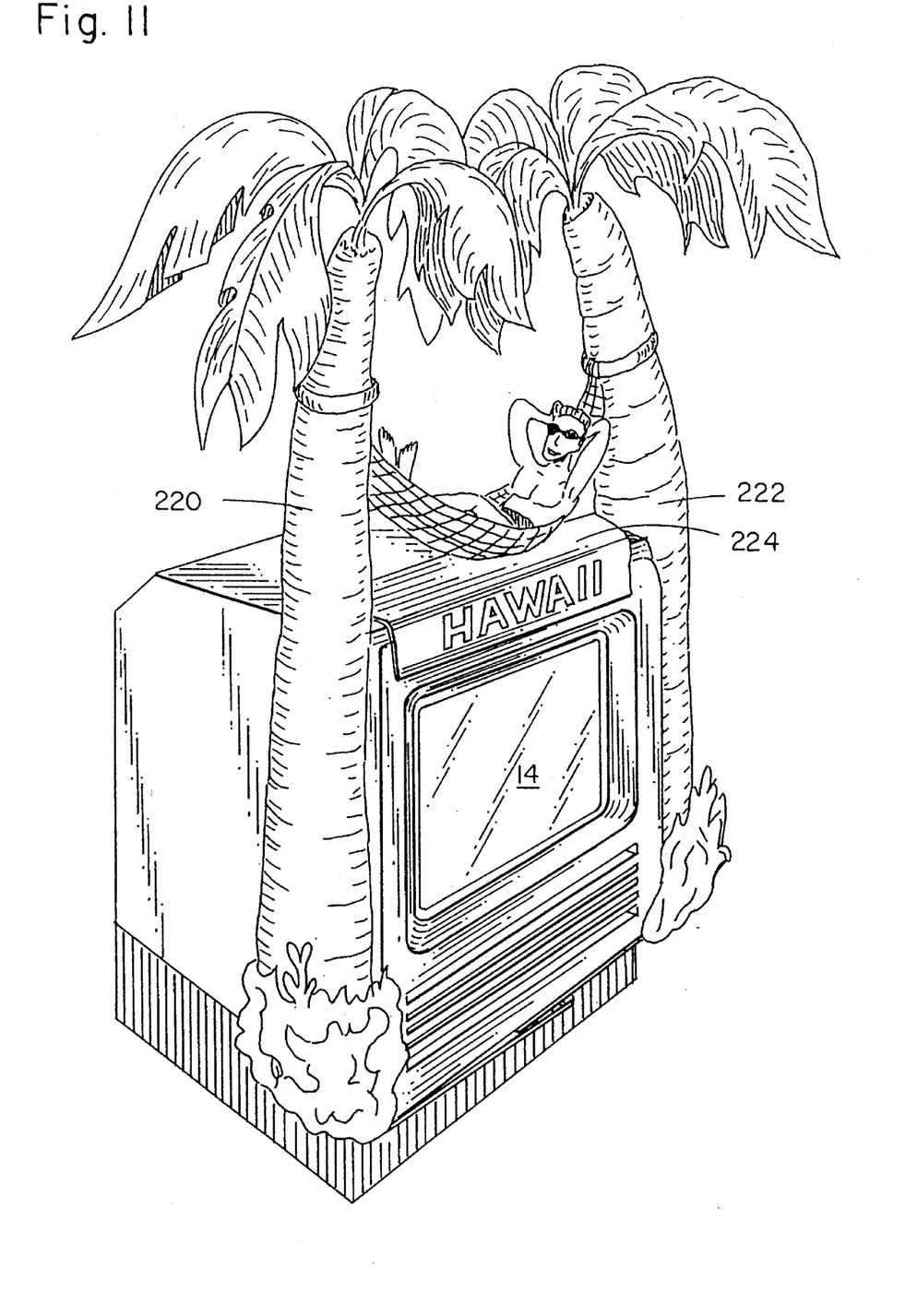
FIG. 11 is a left side view of another alternative embodiment of the decorative apparatus depicting a beach scene around the screen of the cathode ray tube.

FIG. 11 shows yet another embodiment of the replaceable decorative attachment having an ornamentation showing a beach scene. The ornamentation has a first vertical portion 220, a second vertical portion 222 and a horizontal portion 224. As shown the first and second vertical portions having the shape of palm trees and a hammock with a figure therein attached to the top of the trees and extending there between. The first vertical portion is supported by the first vertical extent 226 and the second vertical portion is supported by the second vertical extent 228 as in prior structures. The horizontal portion 224 is positioned along the horizontal upper extent of the strap 230 with an extension hanging over the flap as in prior structures. The extension has an interior side with a pile-type fastener assembly for affixing to the pile-type fastener of the strap similar to the structure 50 and 28 respectively of FIG. 5. The exterior side has indicia in the form of a location "HAWAII" indicative of the ornamentation.

Figure 12:
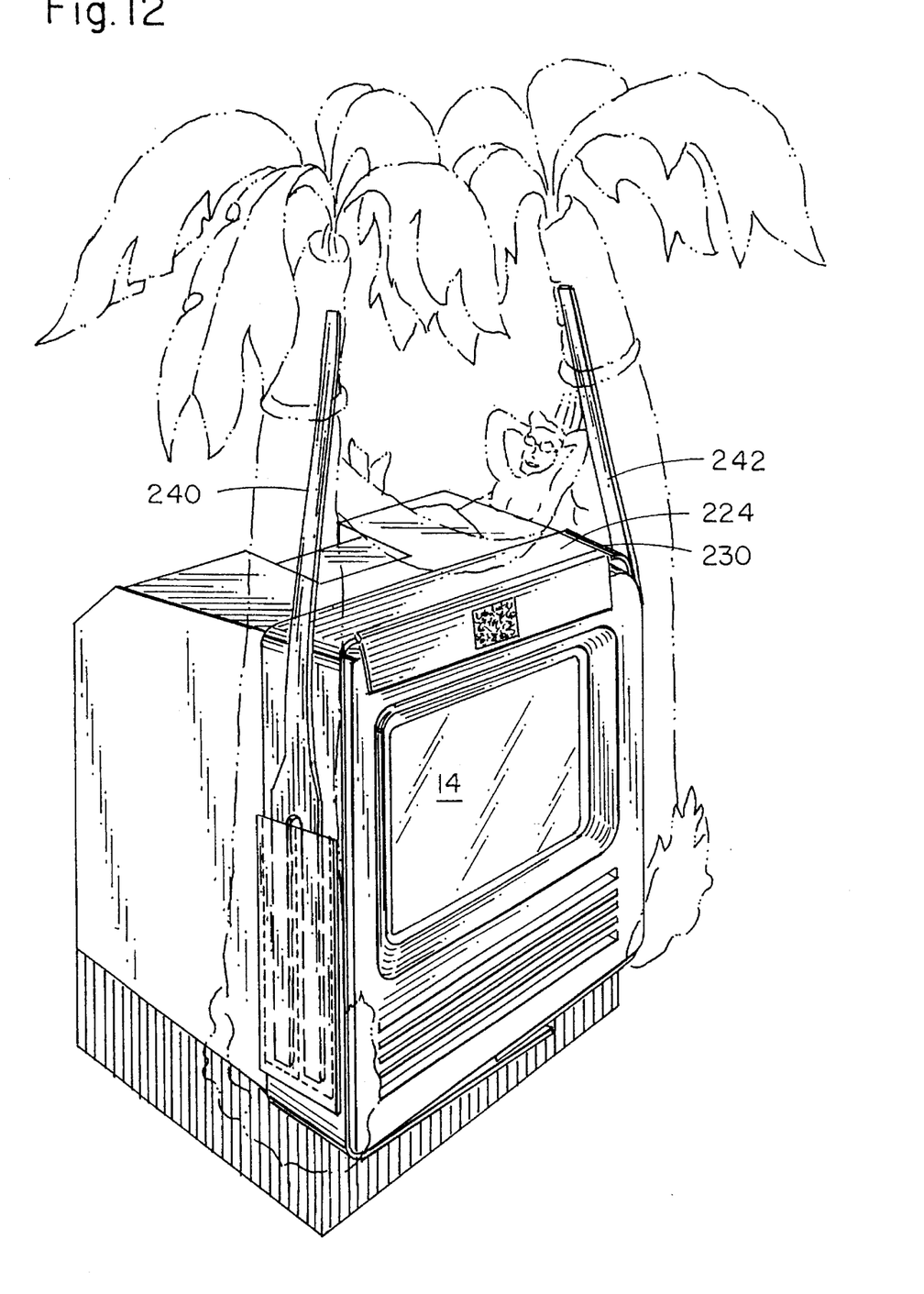
FIG. 12 is a cross sectional view of the left side of FIG. 10.

FIG. 12 show the palm trees have bifurcated a first bifurcated rod 240 and a second bifurcated rod 242 extending throughout. The bifurcated rods of lengths essentially equal to the length of the pockets for positioning in the pockets. The bifurcated rods extend downward and are coupled at their upper extents to an adjacent section of the interior of the ornamentation for proper positioning. The bifurcated rods with their bifurcations extending downwardly into the double pocket to support and prevent the hammock from causing the tops of the trees to rotate and/or collapse inwardly.

In each of the embodiments the replaceable decorative means generally comprises an outer cover formed in the shape of an ornamental object. The ornamentation is stuffed or formed of a resilient material such as cotton, polystyrene beads, or a flexible neoprene or similar suitable material. It is understood that the replaceable decorative means described here in the drawings represent only presently preferred embodiments. Various other embodiments may be desirous. Many different ornamental scenes are possible. Thus these and other modifications and additions may be obvious to those skilled in the art and may be implemented to adapt the present invention for use in a variety of different applications.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. An apparatus for use with a cathode ray tube, the cathode ray tube having a screen, a screen end, an upper surface, a lower surface and side surfaces, said apparatus being capable of being positioned around the screen end of the cathode ray tube, said apparatus comprising in combination:

a strap of a flexible material having a circumference capable of being positioned around the upper surface, lower surface and side surfaces of the cathode ray tube adjacent its screen end to form a cylinder with a rectangular cross section, the strap having a generally horizontal axis capable of extending through the screen of the cathode ray tube, the strap capable of assuming a generally rectangular configuration when placed around the screen forming two vertical side extents, an upper horizontal extent and a lower horizontal extent, the strap including a flap extending downwardly a short distance from the upper horizontal extent;

a pile-type fastener secured to a central region of the flap in a vertical orientation;

a plurality of pockets attached to the vertical extents of the strap, a stitched seam permanently attaching the pockets to the strap, the stitched seam sewn along vertical end edges and a lower horizontal end edge of the pocket forming a U-shaped seam, the pockets having an opening along their upper horizontal end edge;

an adjustable structure in the lower horizontal extent of the strap diametrically opposed from the flap; and a replaceable decorative attachment supportable by the strap, the pocket and the pile-type fastener, the decorative attachment being a doll, the doll having a first vertical portion, a second vertical portion and an upper horizontal portion, the first and second vertical portions having rods, the rods being coupled at their upper extents to an adjacent section on an exterior surface of the attachment, the rods have a lengths and widths essentially equal to the lengths and widths of the pockets for positioning in the pockets of the strap, the first and second vertical portions formed in the shape of legs, the upper horizontal portion being positioned on the upper extent of the strap, the upper horizontal portion having a rectangular extension for positioning over the flap of the strap, the rectangular extension having an interior side and an exterior side, the interior side having a pile-type fastener assembly for affixing to the pile-type fastener of the strap, the exterior side having indicia, the doll having a head and a face, the head extending upwardly from the upper horizontal portion being of such strength so as to remain in an upright position from the upper horizontal extent of the strap.

2. An apparatus for use with a cathode ray tube, the cathode ray tube having a screen, a screen end, an upper surface, a lower surface and side surfaces, said apparatus being capable of being positioned around the screen end of the cathode ray tube, said apparatus comprising in combination:

a strap of a flexible material having a circumference capable of being positioned around the upper surface, the lower surface and side surfaces of the cathode ray tube adjacent its screen end to form a cylinder with a rectangular cross section, the strap having a generally horizontal axis capable of extending through the screen of the cathode ray tube, the strap capable of assuming a generally rectangular configuration when placed around the screen forming two vertical side extents, an upper horizontal extent and a lower horizontal extent;

a pile-type fastener secured relative to a central region of the upper horizontal extent of the strap;

a plurality of pockets permanently attached to the vertical side extents of the strap, the pockets being attached along vertical end edges and a lower horizontal end edge of the pocket;

an adjustable structure in the lower horizontal extent of the strap diametrically opposed from the upper horizontal extent; and a replaceable decorative attachment supportable by the strap, the pockets and the pile-type fastener.

3. The apparatus as set forth in claim 2, and further including a flap coupled to and extending downwardly a short distance from the central region of the upper horizontal extent of the strap, said pile-type fastener being coupled to said flap.

4. The apparatus as set forth in claim 3 wherein the replaceable decorative attachment is an ornamentation in the form of a doll.

5. The apparatus as set forth in claim 4 wherein the doll has a first vertical portion, a second vertical portion and an upper horizontal portion being positioned around the strap, the first and second vertical portions formed in the shape of legs, the first and second vertical portions having rods of a lengths and widths essentially equal to the lengths and widths of the pockets for positioning in the pockets, the upper horizontal portion of the doll being positioned on the upper horizontal extent of the strap, the upper horizontal portion of the doll having a rectangular extension for positioning adjacent to the flap and the pile-type fastener of the strap.

6. The apparatus as set forth in claim 5 wherein the flap supports the pile-type fastener and the rectangular extension of the doll has an interior side and an exterior side, the interior side having a pile-type fastener assembly for affixing to the pile-type fastener of the flap and the exterior side having indicia.

7. The apparatus as set forth in claim 5 wherein the doll has a head and a face, the head extending upwardly from the upper horizontal portion being of such strength so as to remain in an upright position.

8. The apparatus as set forth in claim 3 wherein the replaceable decorative attachment is an ornamentation formed in a sporting event scene, the scene comprising a pair of football goal posts, a football and a kicking tee.

9. The apparatus as set forth in claim 8 wherein the pockets include upper pockets and lower pockets and the sporting event scene has a first and a second vertical portion formed thereon the shaped of goal post, the goal post having upper bifurcated rods and lower rods, the upper rods extending upwardly having a length equal to the length of upper pockets, the lower rods having lengths and widths essentially equal to the lengths and widths of the lower pockets for positioning in the lower pockets of the strap, and further including a horizontal portion on the scene including a rectangular extension for positioning over the flap.

10. The apparatus as set forth in claim 9 wherein the horizontal portion has the football positioned on the kicking tee and the football extending upwardly from the horizontal expanse being of such strength so as to remain in an upright position from the upper surface of the cathode ray tube.

11. The apparatus as set forth in claim 9 wherein the rectangular extension has an interior side and an exterior side, the interior side having a pile-type fastener assembly for affixing to the pile-type fastener of the flap of the strap and the exterior side having indicia.

12. The apparatus as set forth in claim 3 wherein the replaceable decorative attachment is an ornamentation formed of a beach scene comprising palm trees, a hammock and a man lying in the hammock.

13. The apparatus as set forth in claim 12 wherein the beach scene has a first and a second vertical portion formed in the shaped of palm trees, the palm trees having bifurcated rods extending downwardly with a length essentially equal to the length of the stalk of the tree and for positioning in the pockets, the pockets having two compartments for containment of the bifurcation of the rods, a horizontal portion having an extension for positioning over the flap, the palm trees having a stalk and connected to the stalk a hammock with the figure of a man laying therein.

14. The apparatus as set forth in claim 13 wherein the extension has an interior side and an exterior side, the interior side having a pile-type fastener assembly for affixing to the pile-type fastener of the flap of the strap and the exterior side having indicia.

15. The apparatus as set forth in claim 2 wherein the adjustable structure is an elastomeric structure.

16. The apparatus as set forth in claim 2 wherein the lower horizontal extent of the strap has a first end edge and a second end edge, the adjustable structure having a first part and a second part, the first part positioned on an exterior side of the first end edge and a second part on an interior side of the second end edge, the first part and the second part being releasably coupled when the exterior side of the first end edge overlaps the interior side of the second end edge.

17. The apparatus as set forth in claim 16 wherein the adjustable structure has a hook and pile type fastener forming the first part and the second part.

18. The apparatus as set forth in claim 16 wherein the adjustable structure has a clasp forming the first part and second part of the adjustment structure, the first part being a catch located on the exterior side of the first end edge and the second part being a holder located on the interior side of the second end edge.

* * * * *